(No Model.)
E. L. CALELY.
HEATING STOVE.
No. 321,681. Patented July 7, 1885.
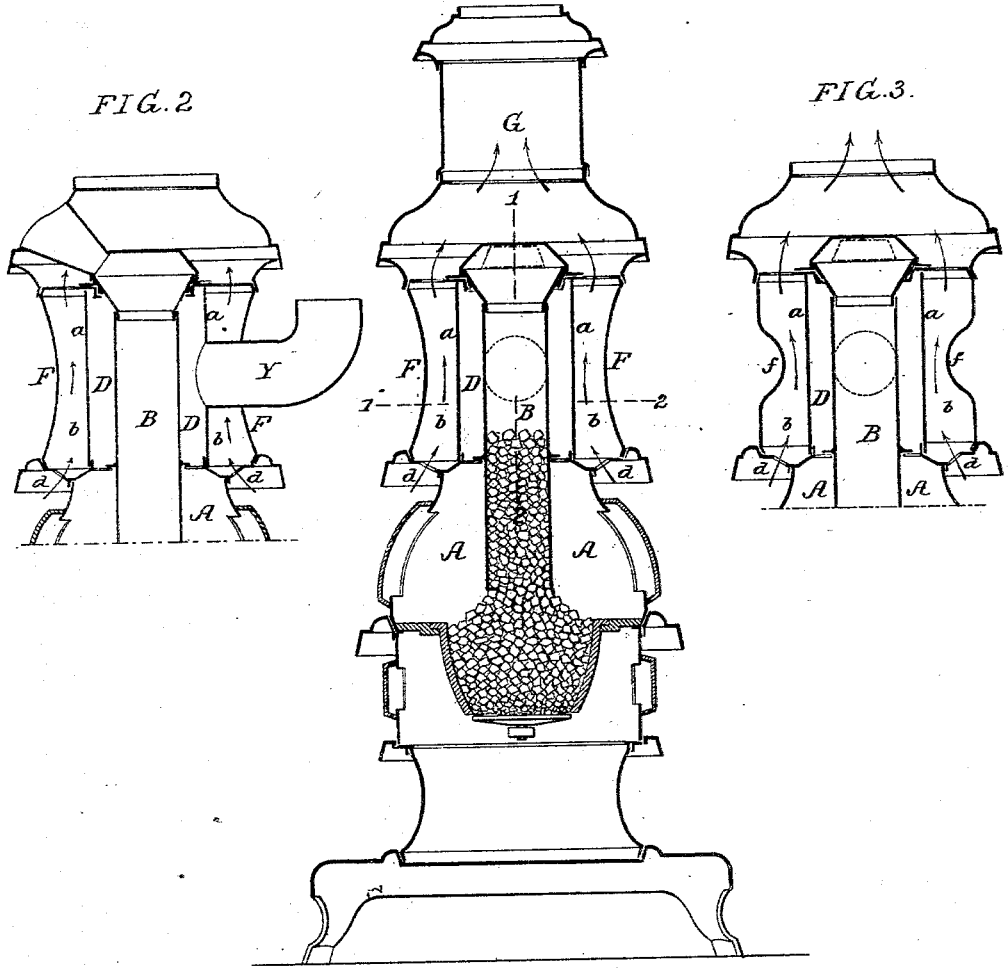
Witnesses
John M. Clayton
James F. Tobin
Inventor
Edward L. Calely
by his Attorneys
Howson & Sons

UNITED STATES PATENT OFFICE.

EDWARD L. CALELY, OF PHILADELPHIA, ASSIGNOR TO GEO. W. FLOYD, IRVIN I. WELLS, ISAAC BROOKE, CHRISTIAN W. WAGNER, WILLIAM WAGNER, ISAAC HALLMAN, AND DAVID FINKBINER, ALL OF ROYER'S FORD, PENNSYLVANIA.

HEATING-STOVE.

SPECIFICATION forming part of Letters Patent No. 321,681, dated July 7, 1885.

Application filed August 21, 1884. (No model.)

*To all whom it may concern:*

Be it known that I, EDWARD L. CALELY, a citizen of the United States, residing at Philadelphia, Pennsylvania, have invented certain Improvements in Heating-Stoves, of which the following is a specification.

My invention consists of an improvement, fully described and claimed hereinafter, in stoves, in which a gas chamber or passage for receiving the products of combustion from the combustion-chamber is contained within a casing between which and an exterior casing is a passage for air to be heated; and the object of my invention is to direct the air against the said casing of the gas-chamber, in order that it may be thoroughly heated before it escapes from the stove.

In the accompanying drawings, Figure 1 is a vertical section of a heating-stove with my improvement; Fig. 2, a transverse section of part of stove on the line 1 2, Fig. 1; Fig. 3, a vertical section illustrating a modification of my invention; and Fig. 4, a sectional plan on the line 1 2, Fig. 1.

A is the main combustion-chamber of the stove; B, the fuel-magazine, and D the gas-chamber communicating with the combustion-chamber. Between the casing $a$ of the gas-chamber and the outer inclosing casing, F, is an annular chamber-passage, $b$, and to the lower end of the latter air is admitted through openings $d$, this air escaping in a heated condition into a drum, G, surmounting the stove, the heated air passing from this drum either directly into the apartment containing the stove or into an upper compartment through a suitable pipe.

The outer casing, F, instead of being cylindrical, as usual, is made with concave sides, as shown, so that the air entering the openings $d$ and rushing through the passage may be deflected by the contracted portion of the casing and caused to impinge against the highly-heated casing $a$ of the gas-chamber, and receive, by intimate contact therewith, a high degree of heat before it enters the drum G.

While I prefer a casing, F, of concave form, this shape need not be adhered to in all cases in carrying out my invention. In Fig. 3, for instance, I have shown a modification in which a cylindrical casing is abruptly contracted at $f$, in order to direct the air in its course through the passage $b$ against the heated casing $a$.

It has not been deemed necessary to explain other parts of the stove, as my invention is restricted to the contraction of the passage $a$, so that as the air takes its course through the passage the local contraction of the latter will cause it to receive a higher degree of heat than if it had to pursue a course through a passage of uniform width.

I am aware that it has been proposed to make a heater with a zigzag combustion-chamber and an outer casing with internal wings or flanges to compel the air to take a course corresponding with the zigzag casing; but such flanges interfere with the free upward passage of air and serve as traps to form dead-air spaces and limit the radiating-surface of the outer casing.

I am also aware that a stove has been devised in which the casing of an air-heating chamber surrounding the combustion-chamber was made of conical form; but in this case the greatest contraction in the area of the air-chamber was at the extreme upper end of the combustion-chamber, so that the air was not directed against said combustion-chamber until just as it was about to issue from the heating-chamber.

In my improved stove, on the contrary, the shape of the casing F is such that the point of greatest contraction is at or about the center of the casing, whereby it has a tendency to direct the air against the casing $a$ almost as soon as it enters the air-chamber, the air then rising close to the said casing, so as to receive as much heat as possible therefrom.

I claim as my invention—

The combination, in a heating-stove, of the gas-chamber having a straight casing, $a$, with the outer casing, F, having a concavity or contraction whereby the air ascending the passage between the casings is caused to impinge against the casing $a$ without interference with its upward movement, the greatest contraction of the casing F being at or about the center, as set forth.

In testimony whereof I have signed my name to this specification in the presence of two subscribing witnesses.

EDWARD L. CALELY.

Witnesses:
 JOHN M. CLAYTON,
 HENRY HOWSON, Jr.